United States Patent [19]

Burzin et al.

[11] 4,143,094

[45] Mar. 6, 1979

[54] PROCESS FOR PRODUCTION OF SATURATED, HIGH-MOLECULAR WEIGHT POLYESTERS

[75] Inventors: Klaus Burzin; Jörn Rüter; Roland Feinauer, all of Marl, Fed. Rep. of Germany

[73] Assignee: Chemische Werke Huls, AG, Fed. Rep. of Germany

[21] Appl. No.: 781,274

[22] Filed: Mar. 25, 1977

[30] Foreign Application Priority Data

Apr. 7, 1976 [DE] Fed. Rep. of Germany ....... 2614980

[51] Int. Cl.$^2$ ...................... C08L 35/02; C08L 35/06; C08L 67/06
[52] U.S. Cl. .................................... 260/873; 528/274
[58] Field of Search ...................... 260/75 R; 260/873; 528/274

[56] References Cited

U.S. PATENT DOCUMENTS

| 4,025,492 | 5/1977 | Binsack et al. | 260/75 R |
| 4,031,065 | 6/1977 | Cordes et al. | 260/75 R |
| 4,049,635 | 9/1977 | Cleary | 260/75 R |
| 4,056,514 | 11/1977 | Strehler et al. | 260/75 R |
| 4,080,354 | 3/1978 | Kramer | 260/873 |

*Primary Examiner*—Allan Lieberman
*Attorney, Agent, or Firm*—Millen & White

[57] ABSTRACT

A process for the production of pol-(butylene terephthalate) of sufficiently high molecular weight for subsequent extrusion processing without the need of a solid phase post-condensation and at polycondensation pressures greater than now in general use. Polycondensation is carried out in the presence of small amounts of copolymers of an α-olefin or styrene with free or esterified maleic acid or anhydride.

9 Claims, No Drawings

PROCESS FOR PRODUCTION OF SATURATED, HIGH-MOLECULAR WEIGHT POLYESTERS

BACKGROUND OF THE INVENTION

The present invention relates to a process for the production of saturated, high-molecular weight polyesters by condensation of terephtahalic acid, which can be up to 30 molar percent substituted by other dicarboxylic acids, with 1,4-butanediol, which can be up to 30 molar percent substituted by other diols, in two stages at an elevated temperature and in the presence of condensation catalysts.

The production of saturated, high-molecular weight polyesters is ordinarily conducted in a two-stage process. In the first stage, generally called the esterification and/or interesterification reaction, the low-molecular weight polyester building blocks are produced. In the second or polycondensation stage, the low-molecular weight initial products are reacted to high-molecular weight products while the diol is removed by distillation.

For the polycondensation stage during the production of poly(butylene terephthalate), a temperature range of 250°–280° C. has been reported under a pressure of 0.7 mbar in J. Pol. Sci., 4,A-1: 1831 et seq. (1966). The reaction time is about one hour. This reference states that, under the disclosed reaction conditions, a great temperature sensitivity is displayed by the poly(butylene terephthalate). On the other hand, it is necessary to conduct the reaction under a very minor pressure to avoid an even greater thermal load on the polycondensate.

If the temperature load is of too long a duration, degradation reactions occur so that a certain molecular weight cannot be exceeded. However, higher molecular weights are required by practical applications technology, e.g., so that processing by means of an extruder can be successfully conducted. For this purpose, an additional solid-phase post polycondensation follows the polycondensation stage under practical conditions.

Such a mode of operation is expensive in various aspects. Therefore, it would be highly desirable to reduce the number of operating steps. This possibility could be achieved if the poly(butylene terephthalate) could be polycondensed within shorter periods of time. Furthermore, it would be highly advantageous if the polycondensation stage could be accomplished under higher pressures of about 25 mbar, i.e. under a water-jet aspirator. Pressures of below 25 mbar, especially below 1 mbar, require very great expenditures for an operation on a large technical scale.

It is an object of this invention to develop a process for the production of poly(butylene terephthalate) making it possible to obtain the polyester, without a solid-phase polycondensation, at sufficiently high molecular weights for extrusion processing. Another object is to effect the polycondensation stage under only a water-jet vacuum.

Upon further study of the specification and appended claims, further objects and advantages of this invention will become apparent to those skilled in the art.

SUMMARY OF THE INVENTION

Briefly, the above and other objects of the present invention are attained in one aspect thereof by conducting the polycondensation reaction in the presence of from 0.005 to 2% by weight, based on the dicarboxylic acid component, of a compound of the general formula

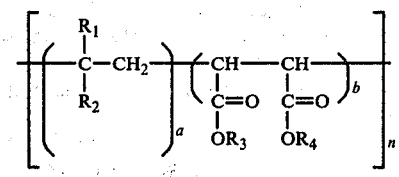

wherein
- a and b are each positive integers from 1 to 100, preferably 20 – 80;
- n is a positive integer from 10 to 10,000, preferably 200 – 8000;
- $R_1$ and $R_2$ are each hydrogen, alkyl of 1–12, preferably 1 – 6 carbon atoms, or phenyl; and
- $R_3$ and $R_4$ are each hydrogen, alkyl or hydroxyalkyl of 1–4 carbon atoms.

DETAILED DISCUSSION

The polyesters produced in accordance with this invention consist, with respect to their acid component, exclusively and/or extensively of terephthalic acid. However, up to 30 molar percent of the terephthalic acid can be replaced by other dicarboxylic acids, e.g., isophthalic acid, phthalic acid, diphenyldicarboxylic acid, 4,4'-sulfonyldibenzoic acid, 1,5- or 2,6-naphthalenedicarboxylic acid, 1,4-cyclohexanedicarboxylic acid, adipic acid, sebacic acid, 1,10-decanedicarboxylic acid, etc.

The diol employed is exclusively or extensively 1,4-butanediol, which can be up to 30 molar percent substitued by other diols, e.g., ethylene glycol, 1,4- or 1,3-dimethylolcyclohexane, 1,3-propanediol, neopentyl glycol, 1,6-hexanediol, 3,3,5-trimethyl-1,6-hexanediol, etc.

The acid as well as the diol can be utilized in the form of ester-forming derivatives.

The compounds of the general formula in accordance with this invention possess molecular weights of 1,000–1,000,000, preferably 10,000–200,000 as determined by gel chromatographic methods. They are added to the reaction mixture in amounts of from 0.005 to 2.0% by weight, preferably 0.05 to 1.0% by weight, based on the acid component. In general, the compounds are added before the interesterification reaction. The addition can also be made at any other desired point in time during the interesterification up to the beginning of the polycondensation.

If the compounds of this invention are present as free carboxylic acids ($R_3 = R_4 =$ hydrogen), it is also possible to effect the addition step at any time up to the end of the polycondensation. It is likewise possible to form the compounds only during the interesterification or polycondensation reaction.

Examples for the compounds of the general formula include but are not limited to ethylene-maleic anhydride copolymers, which can be esterified with lower alcohols, styrene-maleic anhydride copolymers, propylene-maleic anhydride copolymers, butene-1-maleic anhydride copolymers, isobutene-maleic anhydride copolymers; ethylene-maleic acid copolymers, styrene-maleic acid copolymers, propylene-maleic acid copolymers, and butene-1-maleic acid copolymers. Especially preferrred are ethylene-maleic anhydride (1:1) copolymers esterified with methanol. The copolymers, the production of which is well known in the art, are obtained according to the conventional methods, e.g., as they have been described in the Encyclopedia of Polymer Science and Technology, Vol. 1, pages 76 et seq. (1964). The esterification products can likewise be prepared according to the customary processes, e.g., by reacting the copolymers with excess alcohols in the presence of acidic catalysts.

Apart from the presence of the compounds of the general formula and the changes resulting therefrom with respect to polycondensation time and polycondensation vacuum, the high-molecular weight poly(butylene terephthalates) are produced according to the conventional methods for high-molecular polyesters, e.g., as they have been described by Sorensen and Campbell in "Preparative Methods of Polymer Chemisty," Interscience Publishers, Inc., pages 111-127, New York (1961), or in "Kunststoff-Handbuch" [Plastics Manual] 80: 697 (Polyesters), Carl Hanser Publishers, Munich (1973).

In this procedure, interesterification is suitably carried out first, e.g., an interesterification of the dicarboxylic acid dimethyl esters with the glycols at 150°-250° C., especially at 180°-200° C., in the presence of 0.01 - 1.0% by weight of interesterification catalysts, such as titanium alcoholates, calcium salts, zinc salts or manganese salts. Subsequently, polycondensation of the thus-contained low-molecular weight intermediate products is carried out at 200°-300° C., especially at 230°-270° C., in the presence of 0.001 - 0.1% by weight of polycondensation catalysts, such as titanium, antimony, germanium or gallium compounds.

For the inactivation of the interesterification catalysts, it is possible to add phosphorus (III) or (V) compounds prior to the polyesterification; these are the customary compounds, such as phosphorous acid, phosphoric acid or organic phosphites or phosphates with alkyl or aryl groups respectively in amounts of 0.01 - 1.0% by weight.

Suitable further additives are customary heat and oxidation stabilizers, such as sterically hindered phenols or secondary amines, as well as pigmenting agents such as titanium dioxide.

The process of this invention has the advantage that the polycondensation stage takes place in half or less of the heretofore customary time period, so that there is practically no degradation of the poly(butylene terephthalate) due to thermal load. It is thereby possible in the melt polycondensation procedure to obtain molecular weights as they are required for the extrusion process which heretofore have been customarily obtained only in a solid-phase polycondensation taking place after the actual polycondensation.

Poly(butylene terephthalates) suitable for the extrusion method should have reduced specific solution viscosities, determined in a solution of 0.23 g. of polyester in 100 ml. of a phenol/tetrachloroethane mixture (60:40) at 25° C., of 1.2 - 1.5 dl./g.

As previously noted, it is possible in accordance with the process of this invention to produce high-molecular weight poly(butylene terephthalate) with the use of a water-jet aspirator in the polycondensation stage. Customarily, the process is conducted in a pressure range of 5 - 40 mbar, preferably 10 - 25 mbar. It is thereby possible to eliminate the customary, expensive high-vacuum units in the production of poly(butylene terephthalate) according to the process of this invention.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLES

Experiments 1 – 8

In a 500 ml. three-necked flask equipped with an agitator and a descending air cooler with a distillation receiver, 194 g. (1 mole) of dimethyl terephthalate (DMT),
180 g. (2 moles) of 1,4-butanediol,
0.03 g. of titanium tetraisopropylate (10% by weight of n-butanol), are melted together with the amount of the compounds to be used according to this invention as indicated in the table. The melt is interesterified for 3 hours at 180°-200° C. under a nitrogen stream, splitting off 66.5 g. of methanol. The interesterification mixture is once again combined with 0.015 g. of titanium tetraisopropylate in 0.15 ml. of butanol and then heated to the polycondensation temperature for one-half hour under a slight nitrogen stream, while the excess 1,4-butanediol is removed by distillation. Then, the vacuum is applied as indicated in the table, and the indicated polycondensation time is maintained.

Experiments A – H

Examples 1-8 were repeated in an identical fashion, without the additive of the invention. The experiments indicated by letters are not in accordance with this invention.

TABLE

| Experiment | Additive | % by Weight | Polycondensation Temperature [° C.] | Vacuum [mbar] | Duration [min.] | RSV-Value (*) [dl./g.] |
|---|---|---|---|---|---|---|
| 1 | 1 | 0.2 | 250 | 0.1 | 30 | 0.82 |
| A | — | — | 250 | 0.1 | 30 | 0.32 |
| 2 | 1 | 0.2 | 270 | 0.1 | 30 | 0.32 |
| B | — | — | 270 | 0.1 | 30 | 0.89 |
| 3 | 1 | 0.3 | 270 | 0.1 | 60 | 1.54 |
| C | — | — | 270 | 0.1 | 60 | 1.05 |
| 4 | 1 | 0.2 | 270 | 25 | 150 | 1.13 |
| D | — | — | 270 | 25 | 150 | 0.15 |
| 5 | 2 | 0.1 | 270 | 0.1 | 30 | 1.38 |
| E | — | — | 270 | 0.1 | 30 | 0.89 |
| 6 | 3 | 0.4 | 250 | 0.1 | 30 | 0.94 |
| F | — | — | 250 | 0.1 | 30 | 0.32 |
| 7 | 3 | 0.4 | 270 | 25 | 120 | 1.24 |
| G | — | — | 270 | 25 | 120 | 0.12 |
| 8 | 4 | 0.2 | 250 | 0.1 | 60 | 1.21 |

TABLE-continued

| Ex- periment | Additive | % by Weight | Polycondensation Temperature [° C.] | Vacuum [mbar] | Duration [min.] | RSV-Value (*) [dl./g.] |
|---|---|---|---|---|---|---|
| H | — | — | 250 | 0.1 | 60 | 0.84 |

1 : Ethylene-Maleic Acid Dimethyl Ester Copolymer (1:1), Mn ~ 20,000
2 : Styrene-Maleic Acid Dimethyl Ester Copolymer (1:1), Mn ~ 35,000
3 : Isobutene-Maleic Acid Dimethyl Ester Copolymer (1:1), Mn ~ 50,000
4 : Ethylene-Maleic Acid Dimethyl Ester Copolymer (3:1), Mn ~ 70,000
(*) Reduced specific viscosity, determined in a solution of 0.23 g. of polyester in 100 ml. of a phenol/tetrachloroethane mixture (60:40) at 25° C.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a two-stage process for the production of saturated, high-molecular weight polyesters whose acid component consists at least 70 molar percent of terephthalic acid and whose diol component consists at least 70 molar percent of 1,4-butanediol wherein the first stage is an interesterification reaction conducted at 150°-250° C. in the presence of an interesterification catalyst and wherein the second stage is a polycondensation reaction conducted at 200°-300° C. at reduced pressure in the presence of a polycondensation catalyst, the improvement which comprises conducting the polycondensation reaction in the presence of 0.005 - 2% by weight, based on the terephthalic acid, of a compound of the general formula

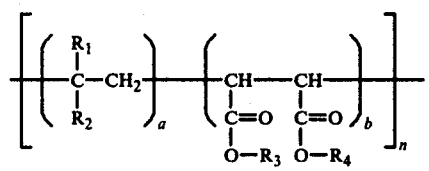

having a molecular weight of 1,000 - 1,000,000 wherein a and b are each positive integers from 1 to 100;
n is a positive integer from 10 to 10,000;
$R_1$ and $R_2$ are each hydrogen, alkyl of 1-12 carbon atoms or phenyl; and
$R_3$ and $R_4$ are each hydrogen, alkyl or hydroxy-alkyl of 1-4 carbon atoms, said compound either being added before the interesterification reaction, or during the interesterification reaction up to the beginning of the polycondensation reaction or, when the compound is a free acid, at any time up to the end of the polycondensation reaction, or said compound being formed during the interesterification or polycondensation reaction.

2. A process according to claim 1, wherein said compound is a copolymer of maleic acid with styrene or an α-olefin.

3. A process according to claim 1, wherein said compound is an alkanol-esterified copolymer of maleic acid with styrene or an α-olefin.

4. A process according to claim 1, wherein 0.05-1% by weight of said compound is employed.

5. A process according to claim 1, wherein said compound is added before the interesterification reaction.

6. A process according to claim 1, wherein the polycondensation reaction is conducted at an absolute pressure of greater than 1 millibar.

7. A process according to claim 6, wherein said pressure is about 5-40 millibars.

8. A process according to claim 1 wherein the compound has a molecular weight of 10,000 - 200,000; a and be each are positive integers from 20-80; n is a positive integer from 200 - 8,000; and $R_1$ and $R_2$ are each hydrogen, alkyl of 1-6 carbon atoms, or phenyl.

9. A process according to claim 6, wherein said pressure is about 10-25 millibars.

* * * * *